(12) United States Patent
Sharma et al.

(10) Patent No.: US 10,715,999 B2
(45) Date of Patent: Jul. 14, 2020

(54) SELECTIVE KEY CACHING FOR FAST ROAMING OF WIRELESS STATIONS IN COMMUNICATION NETWORKS

(71) Applicant: Meru Networks, Sunnyvale, CA (US)

(72) Inventors: Manas Sharma, Bangalore (IN); Manish Shukla, Pune (IN); Ligeo George, San Jose, CA (US)

(73) Assignee: Fortinet, Inc., Sunnyvale, CA (US)

(*) Notice: Subject to any disclaimer, the term of this patent is extended or adjusted under 35 U.S.C. 154(b) by 186 days.

(21) Appl. No.: 14/936,669

(22) Filed: Nov. 9, 2015

(65) Prior Publication Data

US 2017/0134940 A1 May 11, 2017

(51) Int. Cl.
*H04W 12/04* (2009.01)
*H04W 12/06* (2009.01)
*H04L 29/08* (2006.01)
*H04L 29/06* (2006.01)
*H04W 84/12* (2009.01)

(52) U.S. Cl.
CPC ......... *H04W 12/04* (2013.01); *H04L 67/2842* (2013.01); *H04W 12/06* (2013.01); *H04W 84/12* (2013.01)

(58) Field of Classification Search
CPC ..... H04W 12/04; H04W 12/06; H04W 84/12; H04L 63/0853; H04L 63/061; H04L 67/2842; H04L 63/0492; H04L 63/0876; H04L 29/08; H04L 29/06
USPC ... 713/153, 168–176, 182–186, 202, 1, 155, 713/166
See application file for complete search history.

(56) References Cited

U.S. PATENT DOCUMENTS

| 8,891,502 B2* | 11/2014 | Baek ............... H04W 12/12 370/338 |
| 2007/0206537 A1* | 9/2007 | Cam-Winget ....... H04L 63/162 370/331 |
| 2016/0295485 A1* | 10/2016 | Ponnuswamy ...... H04W 4/80 |

OTHER PUBLICATIONS

IEEE Standard 802.11 r™-2008 (attached in the office action).*
IEEE 802.11R standard, 2008.*

* cited by examiner

*Primary Examiner* — Kevin Bechtel
*Assistant Examiner* — Quazi Farooqui
(74) *Attorney, Agent, or Firm* — Law Office of Dorian Cartwright; Dorian Cartwright (57) ABSTRACT

Authentication keys are selectively cached locally for faster roaming of wireless stations in a communication network. An attempt by a station to reassociate with an access point is detected. Responsive to identifying a key corresponding to the station as evidence of a previous association, the key is retrieved from the key cache without contracting a controller or an authentication server, for faster responses. At least one modified response frame is generated to include the identified key along with an approval of the association between the access point and the station. The at least one modified response is sent from the access point to the station. An attempt to roam to a station for a first time is detected responsive to a key cache miss at the access point. If the station has previously associated with an access point under purview of the controller, keys are located and sent back to the access point without contacting an authentication server as an improvement over IEEE 802.11r. The retrieved key can then be stored at the access point key cache for future use. An initial connection to the network is detected responsive to a key cache miss at the controller. In this case, authentication keys are retrieved from an authentication server.

7 Claims, 8 Drawing Sheets

SELECTIVE KEY CACHING FOR FAST ROAMING OF WIRELESS STATIONS IN COMMUNICATION NETWORKS

FIELD OF THE INVENTION

The invention relates generally to Wi-Fi computer networking, and more specifically, to selectively caching authentication keys for fast roaming of wireless stations in communication networks.

BACKGROUND

Many secured local area network (LAN) deployments user IEEE 802.1X based security to provide support for centralized user identification, authentication, dynamic key management, and accounting. The IEEE standards are promulgated by the Institute of Electrical and Electronics Engineers. The process of obtaining a valid authentication key is a multi-step process where many packets are exchanged at each step between wireless client, authenticator (i.e., access point and controller), and a RADIUS (Remote Authentication Dial-In User Service) server. Wireless client devices that have delay-sensitive applications such as voice and video suffer significantly when the wireless client roams from one access point to another due to the excessive packet exchange.

The IEEE 802.11r defines a fast Basic Service Set (BSS) transition between access points by redefining security key negotiation protocol where part of the key derived from the RADIUS server, thereby avoiding the full IEEE 802.1X process at every transition. However, the specific protocol of how and where keys are cached, and when keys are distributed was not described.

Cloud-based services are another area of concern because network travel time degrades service performance. The network travel time is the duration of a frame traveling from a source to a destination. Cloud-based controllers, as a result of this added flight time, underperform relative to LAN located controllers. A controller is responsible for a group of access points on a LAN and needs frequent communication with the access points. Moreover, when security keys are not properly cached, the performance of IEEE 802.11 suffers as well.

Therefore, what is needed is a robust technique for selectively caching authentication keys for fast roaming of wireless stations in communication networks.

SUMMARY

These shortcomings are addressed by the present disclosure of methods, computer program products, and systems for selectively caching authentication keys for faster roaming of stations in communication networks.

In one embodiment, an attempt by a station to reassociate with an access point is detected. The station has a unique identifier (e.g., a MAC or media access control address). A key cache of the access point is searched using the station unique identifier. The key cache stores a plurality of authentication keys and associated unique identifiers locally at the access point. Each key can be previously retrieved during previous association between the access point and the station. Responsive to identifying a key corresponding to the station as evidence of a previous association, the key is retrieved from the key cache without contacting a controller or an authentication server, for faster responses. At least one modified response frame is generated to include the identified key along with an approval of the association between the access point and the station. The at least one modified response is sent from the access point to the station.

In another embodiment, an attempt to roam to a station for a first time is detected responsive to a key cache miss at the access point. A key cache of a controller is searched using the station unique identifier. In one case, the controller key cache is accessed due to a stale key being stored locally at the access point key cache. If the station has previously associated with an access point under purview of the controller, keys are located and sent back to the access point without contacting an authentication server as an improvement over IEEE 802.11r. The retrieved key can then be stored at the access point key cache for future use.

In still another embodiment, an initial connection to the network is detected responsive to a key cache miss at the controller. In this case, authentication keys are retrieved from an authentication server using RADIUS, IEEE 802.1X or some other protocol.

Advantageously, access point speed up roaming. Stations can roam a network and reassociate with access points in a faster manner by eliminating a number of communications.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The present invention provides methods, computer program products, and systems for selectively caching authentication keys for faster station roaming in a Wi-Fi network. One of ordinary skill in the art will recognize that many other scenarios are possible, as discussed in more detail below.

Systems for Selective Key Caching (FIGS. 1-4)

Figure 1:
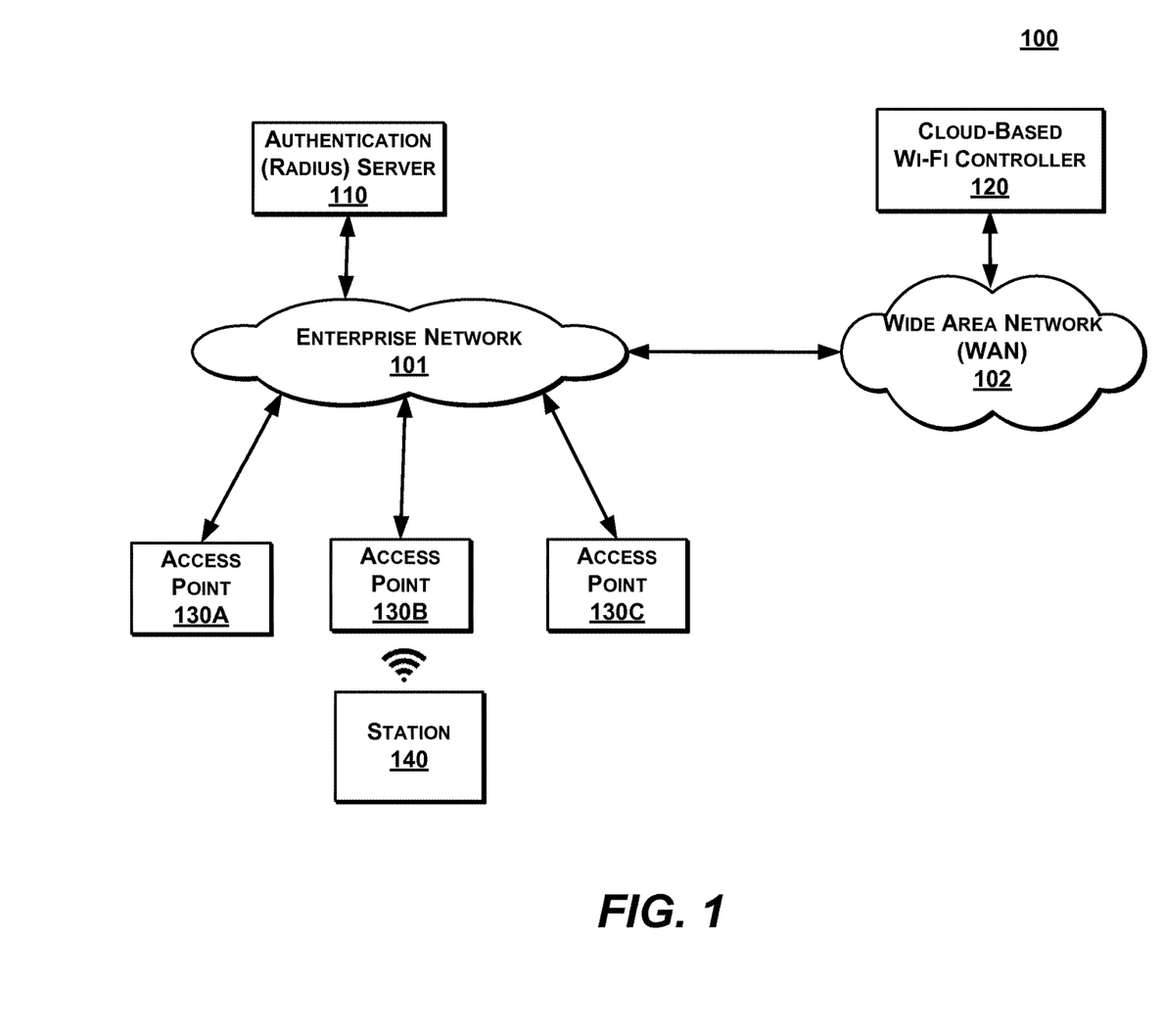
FIG. 1 is a high-level block diagram illustrating a system for selectively caching authentication keys for fast roaming of stations in a communication network, according to one embodiment.

FIG. 1 is a high-level block diagram illustrating a system 100 for hybrid key caching for fast roaming of stations in a communication network, according to one embodiment. The system 100 comprises an internal, enterprise (LAN) network 101 and external, wide area network (WAN) 102 coupled by any communication channel such as a gateway enabled connection, a switch, a router, a plurality of individual connections between local components and external component, or the like. Components coupled to the enterprise network 101 comprise an authentication (RADIUS (remote authentication dial-in user service)) server 110, access points 130A-C, and station 140. A cloud-based Wi-Fi controller 120 is coupled to the WAN 102.

In some embodiments, the cloud-based Wi-Fi controller 120 is coupled to the enterprise network 101 either directly or indirectly (e.g., connected through a firewall). Additional network components can also be part of the system 100, such as firewalls, virus scanners, routers, switches, application servers, databases, as well as additional controllers, access points, access switches, stations, and the like. The network components can be implemented as hardware, software, or a combination of both.

Embodiments of the system 100 can be implemented in conjunction with a network security system, for example, the FortiGate Network Security platform by Fortinet of Sunnyvale, Calif. The enterprise network 101 can serve, for example, a business enterprise, a hospital or system of hospital, school, building, a home, a coffee shop hot spot, a private network, or the like. A combination of wired and wireless devices can be connected, as well as only wireless devices or only wired devices. The WAN 102 can be, for example, the Internet, a cellular network, or even a large enterprise network to which the enterprise network 101 is a smaller component of. In a preferred embodiment, the station 140 is coupled to the access points 120A-C over a wireless RF channel. The cloud-based Wi-Fi controller 120 is coupled to the WAN 102. Components can be directly connected or communicatively coupled through a network, despite the example of FIG. 1. Components can use communication protocols such as IEEE 802.11, IEEE 802.3, Bluetooth, 3G and 4G.

The authentication server 110 can operated under RADIUS protocol for centralized AAA (authentication, authorization and accounting) for users and/or devices connecting to the enterprise network 101. RADIUS can run in the application layer, using UDP as transport. Additional embodiments are shown and described in relation to FIG. 2.

Figure 6A:
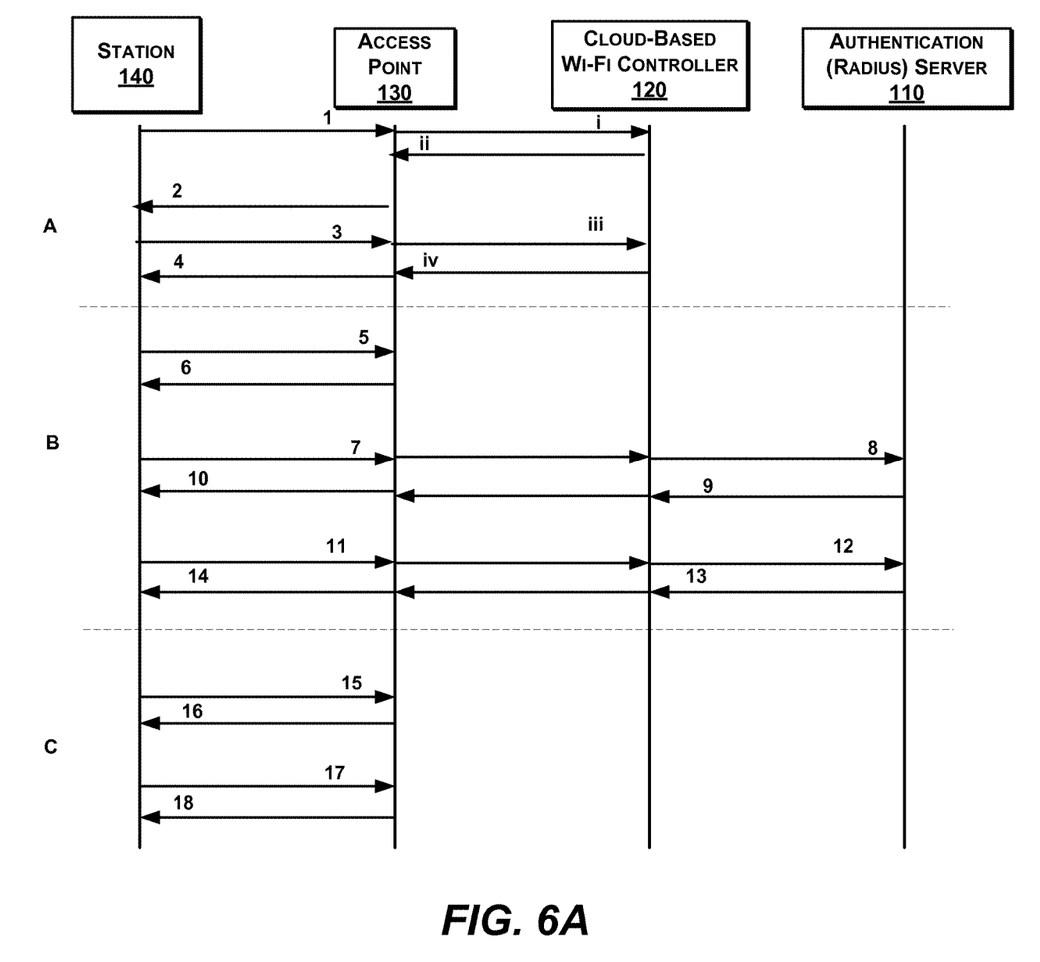
FIG. 6A is a more detailed block diagram illustrating the step for retrieving keys from authentication server during an initial association with WLANs, from the method of FIG. 5, according to one embodiment.

The cloud-based Wi-Fi controller 120 caches authentication keys for connected stations, for faster roaming as those stations associated with new access points. Advantageously, rather than having to again authenticate and retrieve a key from the authentication server 110 (as shown in FIG. 6A), reauthentication is handled at the Wi-Fi controller level (see the elimination of frames between FIGS. 6A and 6B). The keys are sent to the access points 130A-C responsive to requests from association that are forwarded to the access points 130A-C upon local key cache misses. In turn, the cloud-based Wi-Fi controller 120 has to first retrieve keys from the authentication server 110 upon a cache miss. Retrieved keys are stored for future use responsive to cache misses. In some embodiments, protocols for authentication include IEEE 802.1X and IEEE 802.11r. A master key sent to the cloud-based Wi-Fi controller 120 from the authentication server 110 can be further customized for a particular station.

More generally, the cloud-based Wi-Fi controller 120 provides remote management of network Wi-Fi services, in some embodiments. Having individual communication with each of the access points 130A-C, 120A,B, management decisions can be made with network-wide considerations rather than allowing independent access points to make decisions selfishly based only local considerations. The remote location of the cloud-based Wi-Fi controller 120 allows powerful server configurations to support small businesses that do not want to purchase a local controller or do not want the network administration responsibilities. In other words, the remote architecture allows companies such a Meru Networks or Amazon to provide controllers as a service for a monthly rate. The remote location also allows for centralized management for an enterprise with one campus in Sunnyvale, Calif. and a second campus in Bangalore, India.

Although the embodiment of FIG. 1 illustrates a controller located in the cloud relative to managed access points, other non-cloud-based configurations are possible. For example, the controller can be locally based with a direct connection to a LAN. Indirect connections interrupt the direct connection with a firewall, proxy server, or gateway, but the device is still local. However, the advantages of having locally cached keys may be realized more in the cloud-based embodiment of FIG. 1 because a time requirement for a number of network interactions between components has been reduced. In one case, a quantitative amount of time savings can be summed up in a sequential manner based the eliminated frames, i.e., for each round trip of frames, the sum of {[processing time to generate frames at sender]+[flight time from sender to receiver]+[processing time between input of those frames and output of response frames at receiver]+[processing of response frames at sender]}, among other factors.

Figure 7:
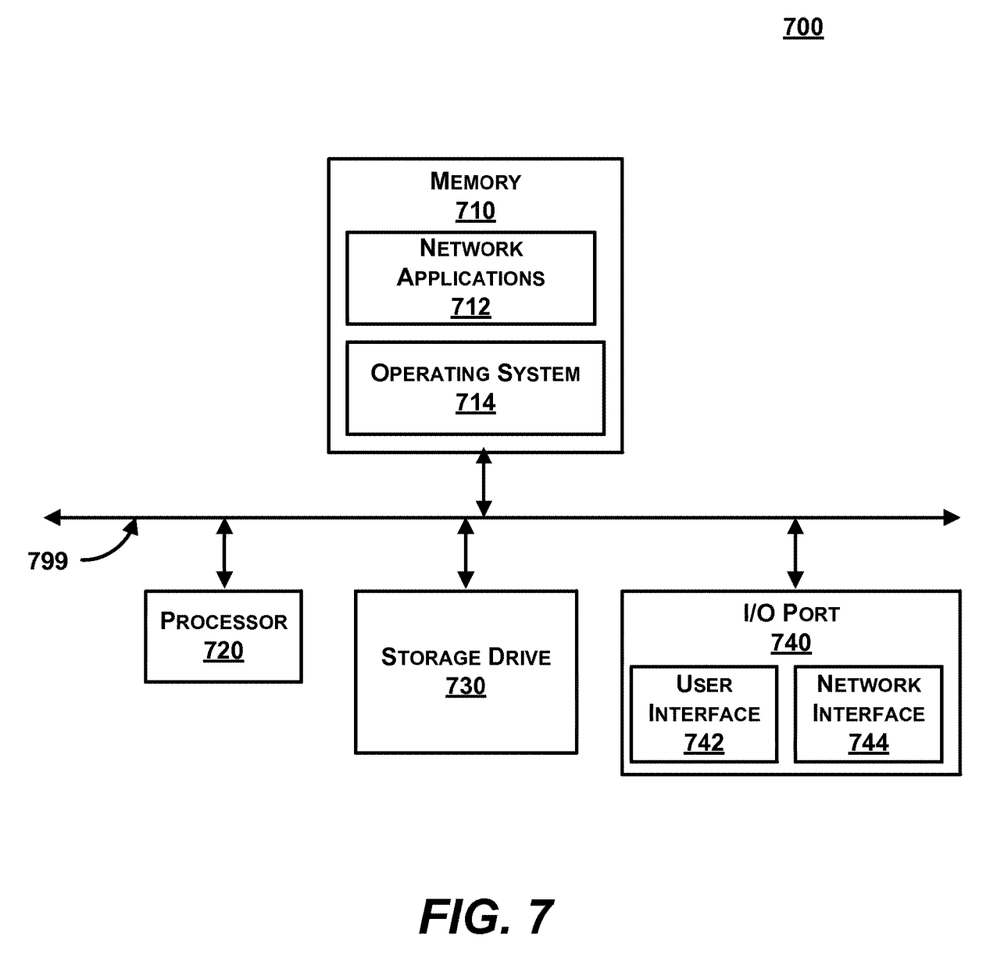
FIG. 7 is a block diagram illustrating an exemplary computing device, according to one embodiment.

The cloud-based Wi-Fi controller 120 can be implemented in any of the computing devices discussed herein (e.g., see FIG. 7). For example, the cloud-based Wi-Fi controller 120 can be an MC1500 or MC6000 device (e.g., as modified) by Meru Networks of Sunnyvale, Calif. Additional functionalities of the cloud-based Wi-Fi controller 120 include management of the access points 130A-C. Further, virtual cell and virtual port services leverage the network-wide view of the system 100 available to the cloud-based Wi-Fi controller 120. More embodiments of the cloud-based Wi-Fi controller 120 are discussed with respect to FIG. 3.

In one embodiment, the access points 130A-C cache authentication keys for connected stations, for faster roaming when those stations reassociate. The access points 130A-C index cached keys and elevate requests to the cloud-based Wi-Fi controller 120 responsive to cache misses. Retrieved keys are cached for future use.

More generally, in providing network service to the station 130, the access points 120A, B can comply with IEEE 802.11 protocols (promulgated by the Institute of Electrical and Electronics Engineers) to provide Wi-Fi service to the station 130 over wireless communication channels. Under IEEE 802.11, a beacon with one or more BSSIDs is periodically sent to advertise a presence for new connections and maintain current connections. Then access points listen for packets addressed to associated BSSIDs and ignore packets addressed to unassociated BSSIDs. Furthermore, the access points 130A-C forward packets addressed to MAC (Media Access Control) addresses of associated stations.

The access points 130A-C physically include one or more individual access points implemented in any of the computing devices discussed herein (e.g., see FIG. 7). For example, the access point 130 can be an AP 110 or AP 433 or AP822 or AP832 (modified as discussed herein) by Meru Networks of Sunnyvale, Calif. A network administrator can strategically place the access point 130 for optimal coverage area over a locale. The access point 130 can, in turn, be connected to a wired hub, switch or router connected to the enterprise network 199 (or an external network). In embodiment, access point functionality is incorporated into a switch or router. In another embodiment, the access points 130A-C are virtual devices.

The station 140 roams between the access points 130A-C, according to one embodiment. Roaming can occur in no particular order because movements can be as random as a person wandering around a building while talking on a smart telephone. Roaming can also be structured when driving on a highway or when a robot is moving according to a preprogrammed route. When associating with one of the access points 130A-C of the enterprise network 101 for the first time, the authentication protocol can be the longest and cause delay. However, when moving to other newer access points for the first time within the enterprise network 101, the station 140 should experience a faster connection because keys are retrieved from the cloud-based Wi-Fi controller 120 (or locally based controller) while eliminating communications with the authentication server 110. Finally, when returning to an access point, the authentication protocol should be the fastest because keys are retrieved from the target access point rather than from the cloud-based Wi-Fi controller 120 or the authentication server 110.

The station 140 can be, for example, a personal computer, a laptop computer, a tablet computer, a smart phone, a mobile computing device, a server, a cloud-based device, a virtual device, an Internet appliance, or any of the computing devices described herein (see e.g., FIG. 7). No special client is needed for this particular technique, although other aspects of the network may require downloads to the station 140. The station 140 access, for example, a LAN (local area network) or external networks using an RF (radio frequency) antenna and network software complying with IEEE 802.11.

Figure 2:
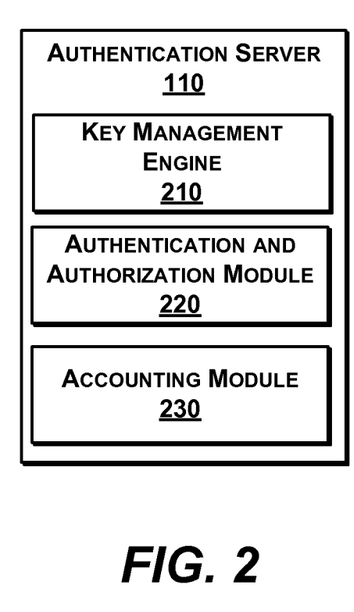
FIG. 2 is a more detailed block diagram illustrating an authentication server of the system of FIG. 1, according to one embodiment.

FIG. 2 is a more detailed block diagram illustrating the authentication server 110 of FIG. 1, according to an embodiment. The authentication server 110 comprises a key management engine 210, an authentication and authorization module 220 and an accounting module 230. Many other variations are possible.

The key management engine 210 coordinates with the components of the cloud-based Wi-Fi controller 120 and the access point 130 for key distribution. The authentication and authorization module 220 receives requests for access to the enterprise network 101 using the RADIUS protocol in accordance with, for example, RFC 2865. The request can include access credentials (e.g., user name and password), network address, phone number, location, and the like. The request can be rejected, challenged or accepted. The accounting module 230 operates according to, for example, RFC 2866, once access is granted for tracking and billing. A record is started with the user's identification, network address, location and unique session identifier, for instance. The record is updated in the interim, and then closed.

Figure 3:
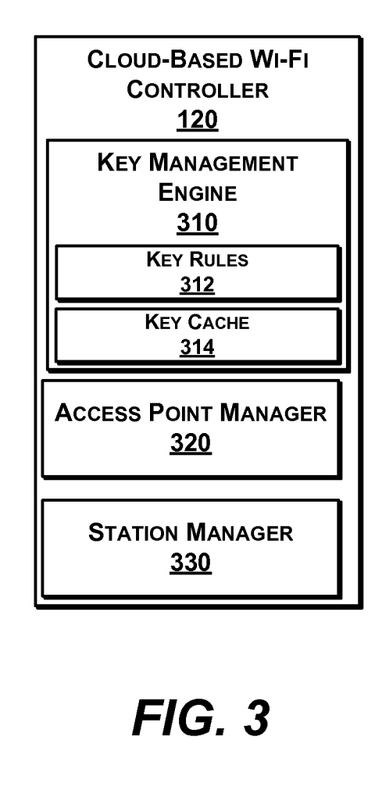
FIG. 3 is a more detailed block diagram illustrating a cloud-based Wi-Fi controller of the system of FIG. 1, according to one embodiment.

FIG. 3 is a more detailed block diagram illustrating the cloud-based Wi-Fi controller 120, according to an embodiment. The cloud-based Wi-Fi controller 120 comprises a key management engine 310, an access point manager 320, and a station manager 330. The components can be implemented in hardware, software, or a combination of both.

The access point manager 320 communicates with a group of access points for Wi-Fi functionality such as assigning BSSIDs and transferring stations between access points. The station manager 330 tracks specific stations and assigned parameters along with movement around the network. Virtual cell and/or virtual port services can be associated with specific stations.

Figure 4:
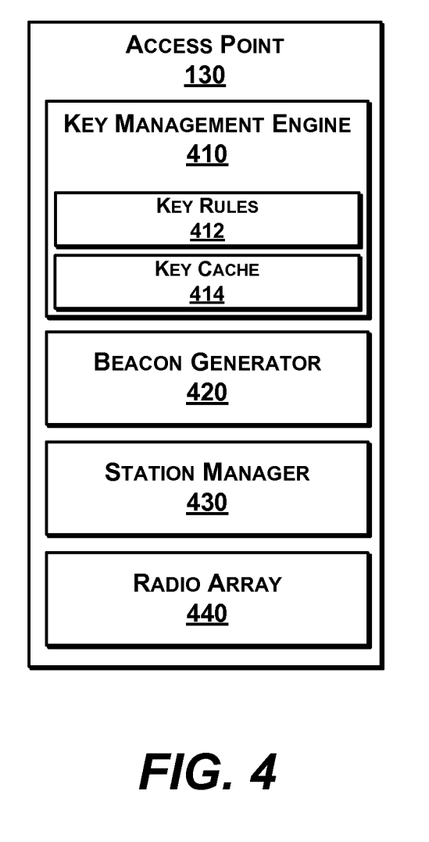
FIG. 4 is a more detailed block diagram illustrating an access point of the system of FIG. 1, according to one embodiment.

FIG. 4 is a more detailed block diagram illustrating an access point 130 (representing either of the access points 130A-C), according to an embodiment. The access point 120 comprises a key management engine 410, a beacon generator 420, station manager 430, and a radio array 440. The components can be implemented in hardware, software, or a combination of both.

The key management engine 410 includes key rules 412 and key cache 414. The key rules 412 refers to algorithms, protocols, and other preconfigured responses to certain conditions, such as cache misses and storing keys. The key cache 414 physically stores keys and can be in a partitioned area or execute on a separate virtual machine.

The beacon generator 420 generates beacons with embedded BSSIDs and parameters, according to IEEE 802.11 protocols. The station manager 430 stores globally and/or locally-influenced parameter values, policy-based parameter values, manually configured parameter values, or the like, for stations and/or BSSIDs. The radio array 440 can include MU-MIMO and SU-MIMO capable antennas, or other conventional antennae.

Figure 5:
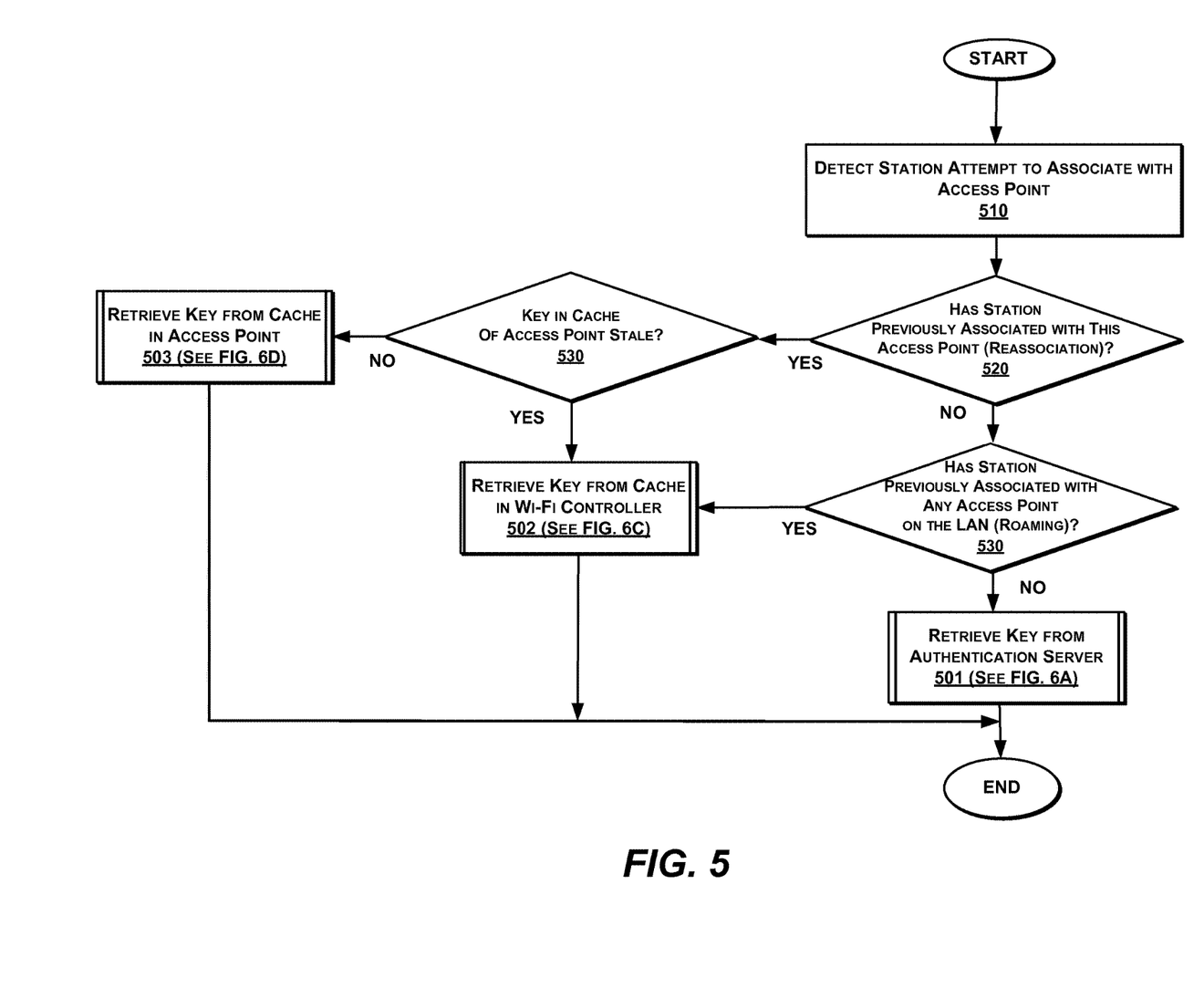
FIG. 5 is a block diagram illustrating a method for selectively caching authentication keys for fast roaming of stations in a communication network, according to one embodiment.
Figure 6B:
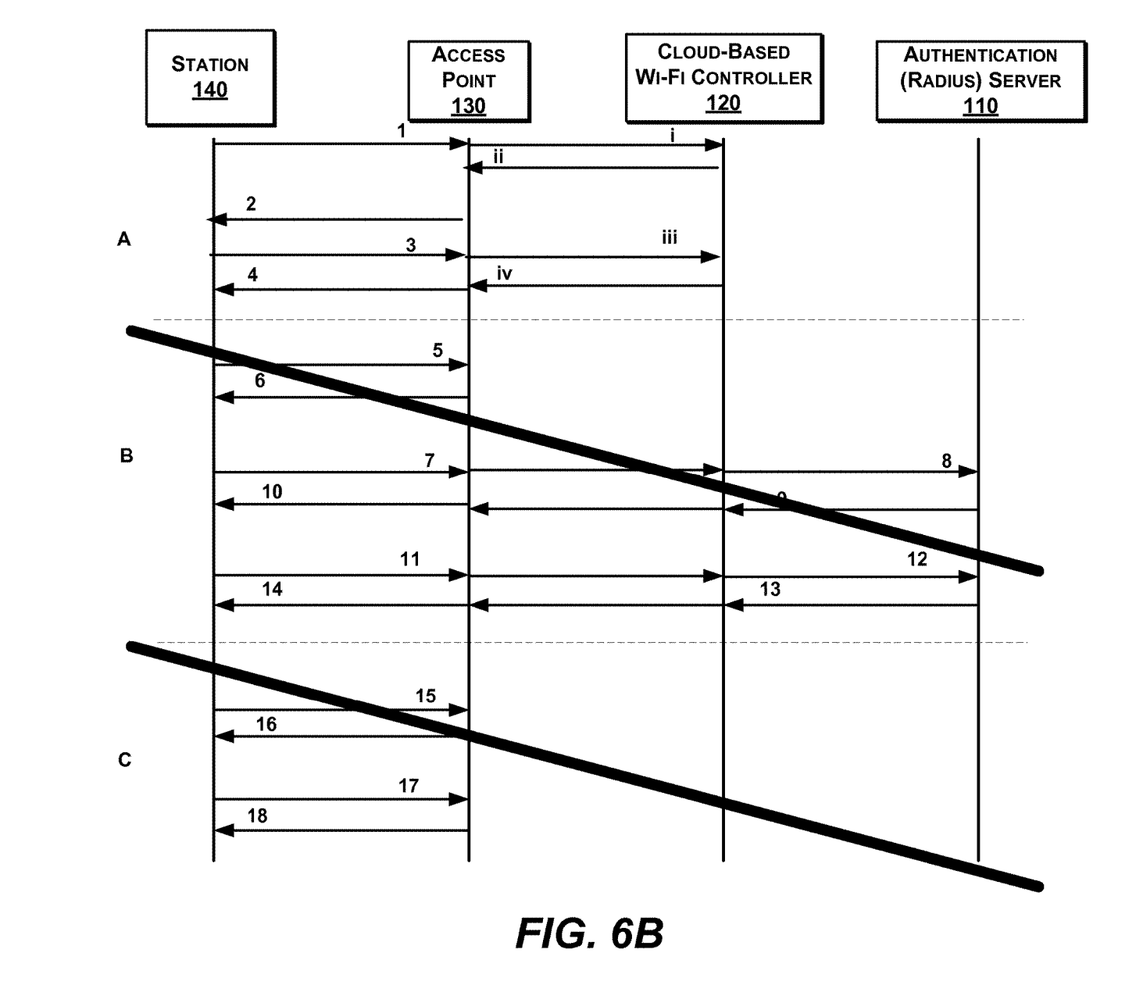
FIG. 6B is a more detailed block diagram illustrating the step for retrieving keys from a Wi-Fi controller when roaming to an access point after the initial association with any access point of a WLAN, from the method of FIG. 5, according to one embodiment.
Figure 6C:
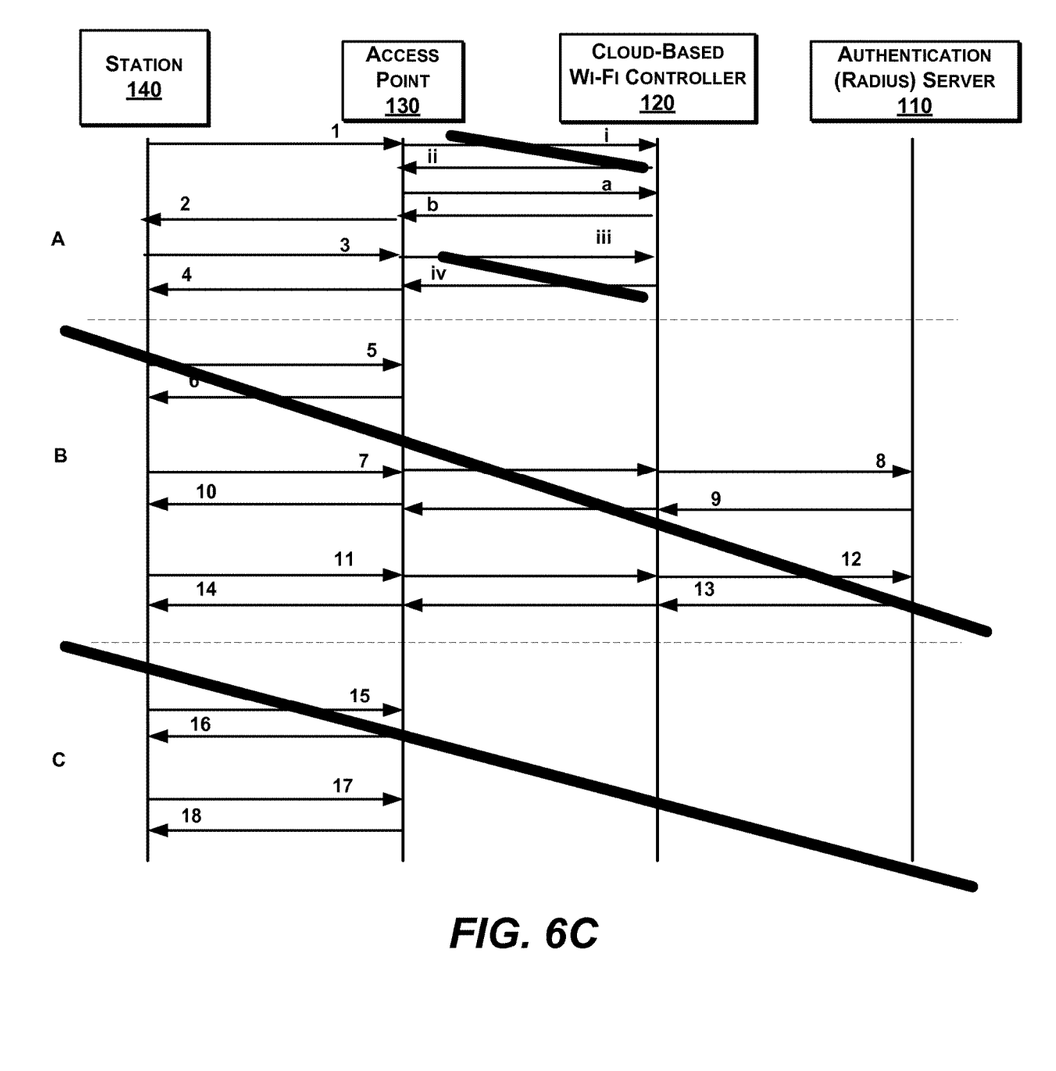
FIG. 6C is a more detailed block diagram illustrating the step for retrieving keys from a cloud-based W-Fi controller key cache when reassociating with an access point having a stale key, from the method of FIG. 5, according to one embodiment.
Figure 6D:
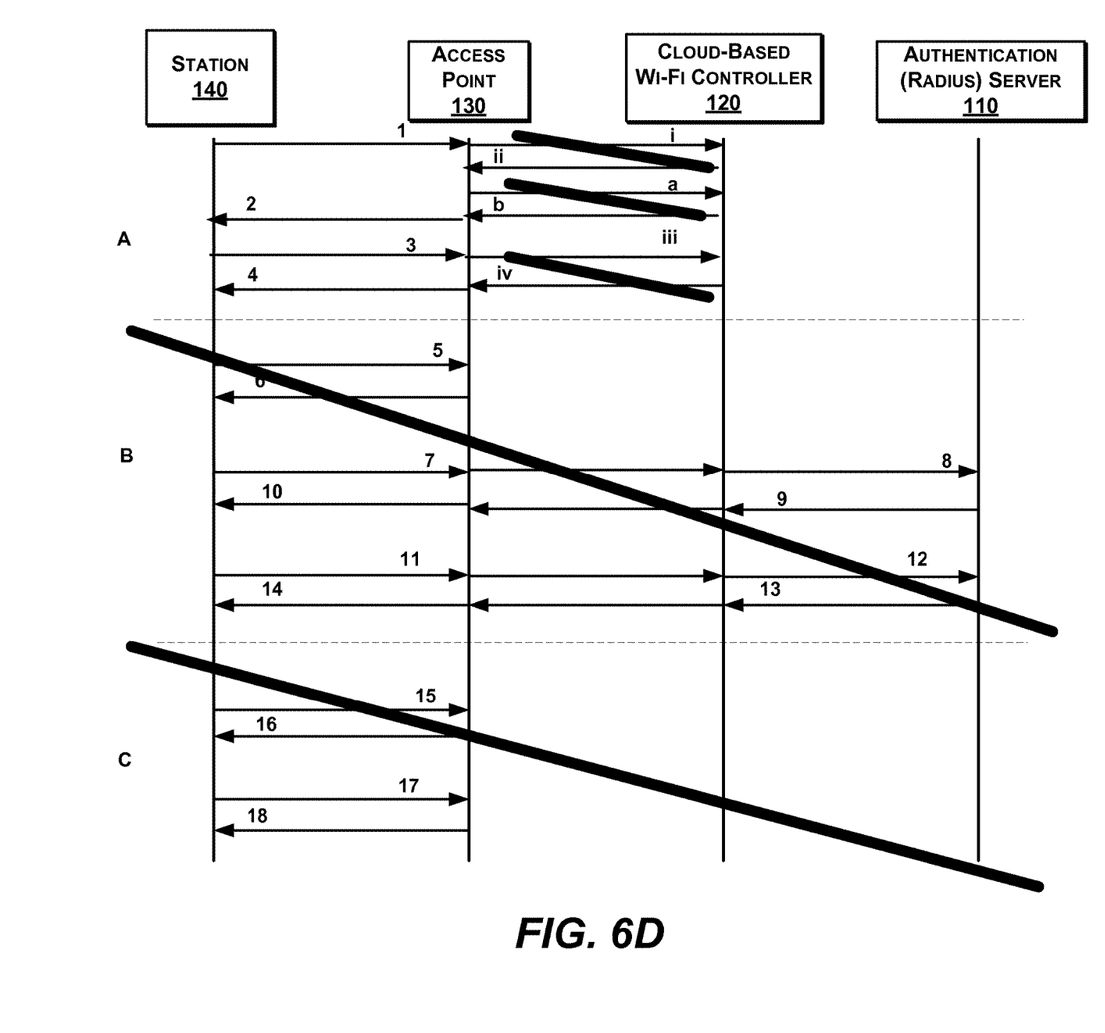
FIG. 6D is a more detailed block diagram illustrating the step for retrieving validated keys from an access point key cache when reassociating with an access point, from the method of FIG. 5, according to one embodiment.

Methods for Selective Key Caching (FIG. 5-6D)

FIG. 5 is a block diagram illustrating a method 500 for hybrid key caching, according to one embodiment. One of ordinary skill in the art will recognize that the method 500 is non-limiting as other embodiments can have more or less steps and can be performed in a different order. The method 500 can be implemented in the system 100 of FIG. 1 or in other components.

A station attempts to associate with a specific access point are detected (step 510). Responsive to previously not being associated with the specific access point, (step 520), it is determined whether the station has previously been associated with any of the access points on a network (step 530). If the station is associating for the first time, a key is retrieved from an authentication server (step 501), as detailed below in association with FIG. 6A.

If the station has previously associated with other access points on a network (step 530), a key is retrieved from cache in a Wi-Fi controller (step 502), as set forth in further detail with respect to FIG. 6C. Similarly, if the station has previously associated with an access point (step 520), and a key in the cache of the access point is stale, a key is also retrieved from cache in a Wi-Fi controller (step 502). As shown in FIG. 6C relative to FIG. 6B, roaming is faster under the current techniques because the number of communications is reduced. However, some embodiments implement the technique of FIG. 6B of 6D when roaming to a station for the first time, even though less efficient.

Alternatively, if a key in the cache of a specific access point is not stale after being previously associated with the specific access point, a key is retrieved from a cache of the specific access point (step 503), as showing in FIG. 6D. In comparing FIG. 6D to FIG. 6C, roaming that reassociates with a specific access point of previous association, a number of communications is reduced even further using the present techniques.

Turning now to FIGS. 6A-6D, the specific sequences for the cases in FIG. 5 are detailed. First, FIG. 6A shows the full set of interactions during an initial association with a network. Section A includes frames for IEEE 802.11 authentication and association request and response (interactions 1 to 4). Section B includes frames for IEEE 802.1X EAPOL messages exchanged between the station and an authentication framework of an access point 130 (i.e., a generic representation of any of the access points 130A-C) and the cloud-based Wi-Fi controller 120 (interactions 5,6,7,10,11, 14), and Radius messages exchanged between the authentication framework and the authentication server 110 (interactions 8,9,12,13). Section C includes frames for IEEE 802.1X EAPOL key messages exchanged between the authentication framework and the station 140 (interactions 14-18). The communication protocol of FIGS. 6A-6D are merely an example showing exhaustive details only for the purpose of non-limiting examples. One of ordinary skill in the art could apply the principles to countless alternative communication protocols, in various embodiments.

A specific listing of interactions includes:
1) 802.11 AUTH REQ
2) 802.11 AUTH RESP
3) 802.11 ASSOC REQ [MDIE, RSNIE]
4) 802.11 ASSOC RESP [MDIE, FTIE(R1KH-ID, ROKH-HD]
5) 802.1X EAPOL Start
6) 802.1X EAPOL Request Identify
7) 802.1X EAPOL Response Identify
8) RADIUS Access Request
9) RADIUS Access Challenge
10) 802.1X EAPOL Request Credentials
11) 802.1X EAPOL Request Credentials
12) RADIUS Access Request
13) RADIUS Access Response—Accept/Reject [PMKSA]
14) 802.1X EAP Success/Failure
15) 802.1X EAPOL—Key [Anonce]
16) 802.1X EAPOL—Key [Shonce, MIC, RSNIE [PMKR1 Name], MDIE, FTIE]
17) 02.1X EAPOL—Key [Anonce, MIC, RSNIE [PMKR1 Name], MDIE, GTK, FTIE]
18) 02.1X EAPOL—Key [MIC]

After successful interactions at interaction 13, the authentication server 110 provides the Pairwise Master Key (PMK) which is also passed to the station 140 as part of the 802.1X EAPOL key message. In the case of 802.11r Fast Roaming, The PMK key for that particular station is used for further key derivation by the cloud-based Wi-Fi controller 120. These derived keys are also distributed to other APs which are part of the same mobility domain.

Second, FIG. 6B shows the reduced number of interactions during roaming to a new access point under IEEE 802.11r, due to key caching at a Wi-Fi controller. More specifically, section B interactions and section C interactions have been eliminated. The 10 interactions are replaced with 4 interactions in section A (interactions i-iv), namely, i) Private RE-AUTH REQ, ii) Private RE-AUTH RESP, iii) Private RE-AUTH REQ, and iv) Private RE-AUTH RESP.

Third, FIG. 6C shows the further reduced number of interactions during roaming to a new access point, under the current techniques, as a result of modified communications. Four of the interactions in section A (interactions i-iv) are eliminated and 2 interactions in section A (interactions a,b) are added, GET_KEY message and SET_KEY message, respectively. GET_KEY Message can be a private control message sent from the new access point to the controller to retrieve key information for the client. The message contains the Client MAC Address for which the derived keys need to be obtained. SET_KEY message can be a private control message sent by the controller to the new access point with the derived keys. These derived keys are extracted by looking up the key cache in the controller for the particular client and Access Point MAC Address.

Finally, FIG. 6D shows the biggest reduction in number of interactions which occurs during reassocation with a previous access point, according to the present techniques, in which a key is cached at an access point. Two of the interactions in section A (interactions a,b) are eliminated, leaving only 4 interactions (i.e. interactions 1 to). Frames 1-4 are standard IEEE 802.11 frames as described earlier. These frames have been expanded as part of the IEEE 802.11r protocol to take care of access point join. The keys would have been already cached.

When a station roams to another access point, the target access point tries to determine if all of the credentials for that station are already available and are not yet stale. For example a GTK for that particular ESSID might be renewed and hence might not be the same. Also, the PMKSA used to derive the PMKRO and PMKR1 might have been renewed and hence stale. In that scenario, an access points fetches correct information from the cloud-based Wi-Fi controller 120 for that particular station (in terms of PMKR0, PMKR1, GTK, etc.) for generation of the correct unicast keys.

Moreover, PMKROName is used to identify the PMKRO key and PMKR1 Name is used to identify the PMKR1 key. In order to form a uniform security key PTK, for some embodiments, the necessary tuples include <PMK-R1, SNonce, ANonce, BSSID and STA-ADDR>. A key cache at access points of a common controller store <PMKROName, PMKR1 Name, PMKR1 Key, BSSID, GTK> for each client MAC address associated with an access point. Upon reception of AUTH_REQ frame, a target access point uses the value of PMKROName and other information to calculate PMKR1 Name. The target access point then checks the key cache as indexed by client MAC address if the target access point to see if the PMKR1 Name key exists.

There are three possible cases: 1) no cache entry for the client MAC address, 2) client MAC address exists in cache but PMKR1 Name does not match, so the key is stale, and 3) client MAC address entry exists and PMKR1 Name matches. In the first case, the access point retrieves a key from a cache at the controller using GET_KEY and SET_KEY message exchange. Upon receiving to new PMK-R1, the target access point adds the new PMK-R1 key and PMKR1 Name along with PMKROName to the cache at the target access point. This scenario may happen when a new client first associates with a mobility domain, i.e., seen for the first time by any access point within a controller. In the second case, a stale key is updated by the target access point using GET-KEY and SET_KEY messages exchanged with the controller. Upon receiving a new PMK-R1, the target access point updates the existing cache entry with the new PMK-R1 key and PMKR1 Name. This scenario may happen when a client station went away (e.g., disconnected or switched off) from this controller and came back again to the mobility domain, thereby getting new PMK keys from 802.1X authentication. The third case is the fastest because a key is in the cache that is not stale and helps reduce the message exchange to a max of 4. This scenario may happen when correct keys were previously distributed to the target access point or a station had roamed to the target access point in the past and is now returning, i.e., reassociating.

Generic Computing Device (FIG. 7)

FIG. 7 is a block diagram illustrating an exemplary computing device 700 for use in the system 100 of FIG. 1, according to one embodiment. The computing device 700 is an exemplary device that is implementable for each of the components of the system 100, including the authentication server 110, the cloud-based Wi-Fi controller 120, the access points 130A-C, and the station 140. The computing device 700 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 700, of the present embodiment, includes a memory 710, a processor 720, a storage drive 730, and an I/O port 740. Each of the components is coupled for electronic communication via a bus 799. Communication can be digital and/or analog, and use any suitable protocol.

The memory 710 further comprises network applications 712 and an operating system 714. The network applications 712 can include the modules of the authentication server 110, the cloud-based Wi-Fi controller 120, the access points 130A-C, and the station 140, as illustrated in FIGS. 1-4. Other network applications 712 can include a web browser, a mobile application, an application that uses networking, a remote application executing locally, a network protocol application, a network management application, a network routing application, or the like.

The operating system 714 can be one of the Microsoft Windows® family of operating systems (e.g., Windows 75, 78, Me, Windows NT, Windows 2000, Windows XP, Windows XP x64 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 720 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 720 can be single core, multiple core, or include more than one processing elements. The processor 720 can be disposed on silicon or any other suitable material. The processor 720 can receive and execute instructions and data stored in the memory 710 or the storage drive 730

The storage drive 730 can be any non-volatile type of storage such as a magnetic disc, EEPROM, Flash, or the like. The storage drive 730 stores code and data for applications.

The I/O port 740 further comprises a user interface 742 and a network interface 744. The user interface 742 can output to a display device and receive input from, for example, a keyboard. The network interface 744 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11 ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in an access point device on a communication network, to selectively cache authentication keys for faster roaming of stations in Wi-Fi communication networks for improved network performance, the method comprising the steps of:

detecting, by a processor of the access point of a plurality of access points managed by a controller, an attempt by a station to associate with the access point, the station having a unique identifier;

searching a key cache of the access point using the station unique identifier, the key cache storing a plurality of keys associated with unique identifiers, each key being previously retrieved during a previous association between the access point and the station;

responsive to identifying a key corresponding to the station as evidence of a previous association, retrieving the key from the key cache of the access point;

responsive to not identifying a key corresponding to the station as evidence of no previous association with the access point, retrieving the key from the controller through a network communication interface of the access point, wherein the controller is cloud-based and is coupled to a wide area network external to an enterprise network, wherein responsive to identifying the key corresponding to the station at the access point as evidence of a previous association with the access point, retrieving the key from the access point;

storing the key in the access point key cache for future use when reassociating with the access point;

subsequent to and responsive to not identifying a key corresponding to the station at the controller as evidence of no previous association with any access point being managed by the controller, the controller retrieving a key from the authentication server through the network communication interface, and wherein responsive to identifying the key corresponding to the station at the controller as evidence of a previous association with a second access point of the plurality of access points, retrieving the key from the controller;

storing the authentication server key in the controller key cache for subsequent use at a different access point of the plurality of access points, wherein the authentication server key is stored in the access point for subsequent use at the access point or any of the plurality of access points being managed by the controller;

generating at least one modified response frame to include the identified key along with an approval of the association between the access point and the station; and sending, through the network communication interface, the at least one modified response from the access point to the station.

2. The method of claim 1, wherein the identified key is sent to the station without further contact with a controller or an authentication server.

3. The method of claim 1, further comprising:

prior to the detecting step, retrieving an authentication key for the station during a previous association between the access point and the station, and storing the authentication key in the access point key cache.

4. The method of claim 1, wherein the authentication server operates under the RADIUS protocol, and uses IEEE 802.1X protocol communications.

5. The method of claim 1, wherein the access point operates under the IEEE 802.11r protocol.

6. The method of claim 1, wherein the station roams between the plurality of access points.

7. A non-transitory computer-readable medium storing source code that, when executed by a processor, performs a method in an access point to selectively cache authentication keys for faster roaming of stations in communication networks, the method comprising the steps of:

detecting, by a processor of the access point of a plurality of access points managed by a controller, an attempt by a station to associate with the access point, the station having a unique identifier;

searching a key cache of the access point using the station unique identifier, the key cache storing a plurality of keys associated with unique identifiers, each key being previously retrieved during a previous association between the access point and the station;

responsive to identifying a key corresponding to the station as evidence of a previous association, retrieving the key from the key cache of the access point;

responsive to not identifying a key corresponding to the station as evidence of no previous association with the access point, retrieving the key from the controller through a network communication interface of the access point, wherein the controller is cloud-based and is coupled to a wide area network external to an enterprise network, wherein responsive to identifying the key corresponding to the station at the access point as evidence of a previous association with the access point, retrieving the key from the access point;

storing the key in the access point key cache for future use when reassociating with the access point;

subsequent to and responsive to not identifying a key corresponding to the station at the controller as evidence of no previous association with any access point being managed by the controller, the controller retrieving a key from the authentication server through the network communication interface, and wherein responsive to identifying the key corresponding to the station at the controller as evidence of a previous association with a second access point of the plurality of access points, retrieving the key from the controller;

storing the authentication server key in the controller key cache for subsequent use at a different access point of the plurality of access points, wherein the authentication server key is stored in the access point for subsequent use at the access point or any of the plurality of access points being managed by the controller;

generating at least one modified response frame to include the identified key along with an approval of the association between the access point and the station; and sending, through the network communication interface, the at least one modified response from the access point to the station.

* * * * *